Aug. 24, 1926.

G. G. ROBERTS 1,597,543

GLASS DRAWING APPARATUS

Filed August 2, 1923

Inventor
George G. Roberts
By Davis & Davis
Attorney.

Patented Aug. 24, 1926.

1,597,543

UNITED STATES PATENT OFFICE.

GEORGE G. ROBERTS, OF WASHINGTON, DISTRICT OF COLUMBIA, ASSIGNOR TO VIRGINIA PLATE GLASS CORPORATION, OF WASHINGTON, DISTRICT OF COLUMBIA, A CORPORATION OF VIRGINIA.

GLASS-DRAWING APPARATUS.

Application filed August 2, 1923. Serial No. 655,286.

This invention has relation to the art of drawing plate glass in the flat. In drawing plate glass in the flat, there is a tendency in the sheet to narrow at its lower end as the sheet ascends. It is the object of the present invention to so construct the crucible from which the sheet is drawn that this tendency to narrow will be inhibited, as more fully hereinafter set forth.

In the drawing—

Figure 1:
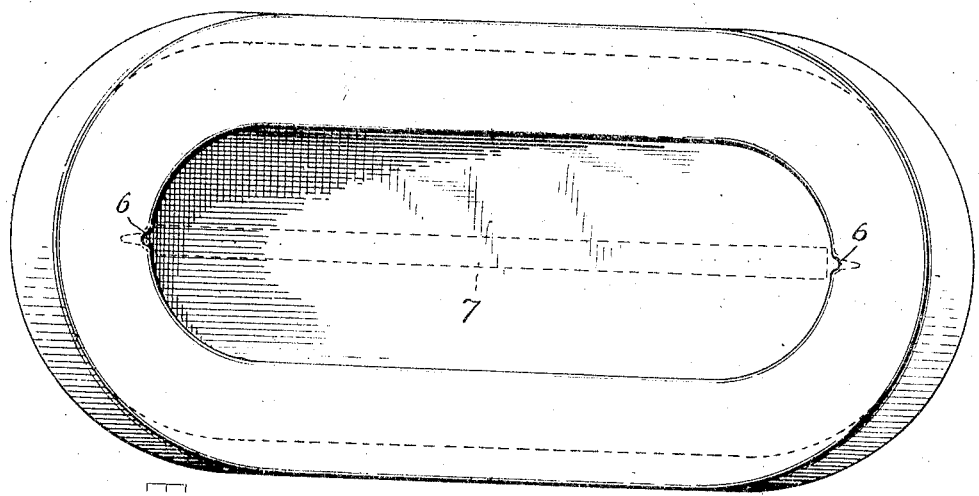
Fig. 1 is a plan view.
Figure 2:
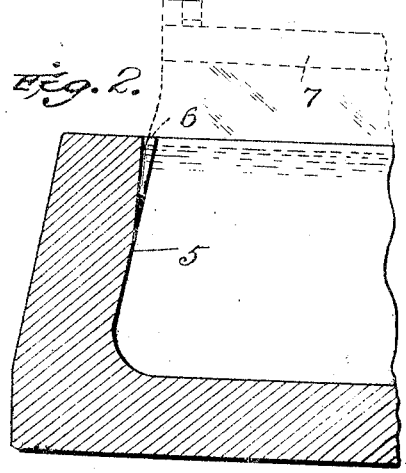
Fig. 2 is a longitudinal sectional view through one end.
Figure 3:
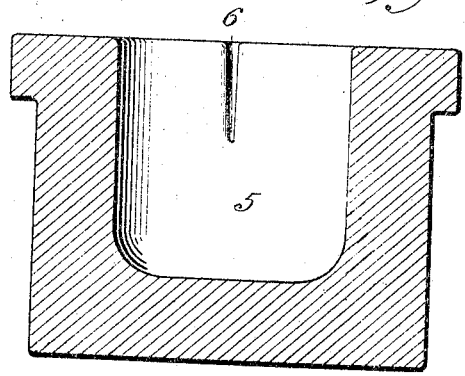
Fig. 3 is a transverse sectional view through the middle part of a crucible constructed to carry out my invention.

In the drawing, I show a crucible of substantially oval or elliptical shape in horizontal section. Each rounded end-wall 5 is undercut, i. e., inclined outwardly toward the end of the crucible. Centrally each of these end-walls 5 is provided with a vertical groove 6. The bait, indicated in dotted lines at 7, is approximately the length of the mouth of the crucible.

The bait is drawn slowly upwardly after having been dipped into the molten glass in the crucible, in the usual manner, by mechanism not shown. The grooves 6 are to guide the edges of the sheet as they form and ascend from the crucible, thus preventing twisting of the sheet. The undercut end-walls of the crucible provide an excess of glass at the edges of the sheet which will prevent the sheet narrowing as it forms and ascends.

I have shown my invention applied to a crucible adapted to hold an individual batch of glass, but it will be understood that the invention may be applied to the well-known continuous process, i. e., the process in which glass is continuously supplied to the crucible, the crucible in that instance serving more in the nature of a nozzle than a crucible.

What I claim as new is:

A glass-drawing crucible of substantially elliptical form in horizontal section having its end-walls undercut, i. e., inclined outwardly toward the ends of the crucible, said end-walls each being provided with a central vertical groove, for the purpose set forth.

In testimony whereof I hereunto affix my signature.

GEO. G. ROBERTS.